United States Patent
Liu et al.

(10) Patent No.: US 11,275,988 B1
(45) Date of Patent: *Mar. 15, 2022

(54) SYNCHROPHASOR MEASUREMENT-BASED DISTURBANCE IDENTIFICATION METHOD

(71) Applicant: NORTH CHINA ELECTRIC POWER UNIVERSITY, Beijing (CN)

(72) Inventors: Hao Liu, Beijing (CN); Tianshu Bi, Beijing (CN); Zikang Li, Beijing (CN); Ke Jia, Beijing (CN)

(73) Assignee: North China Electric Power University, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/412,892

(22) Filed: Aug. 26, 2021

Related U.S. Application Data

(63) Continuation of application No. 17/173,966, filed on Feb. 11, 2021, now Pat. No. 11,176,442.

(51) Int. Cl.
  *G06N 3/04* (2006.01)
  *G06N 3/08* (2006.01)
  *G06K 9/00* (2022.01)

(52) U.S. Cl.
  CPC .......... *G06N 3/04* (2013.01); *G06K 9/00523* (2013.01); *G06N 3/084* (2013.01)

(58) Field of Classification Search
  CPC ................................. G06N 3/04; G06N 3/084
  See application file for complete search history.

(56) References Cited

U.S. PATENT DOCUMENTS

| | | | |
|---|---|---|---|
| 2020/0293032 A1* | 9/2020 | Wang | G01R 19/2513 |
| 2020/0327264 A1* | 10/2020 | Wang | G06N 7/005 |
| 2021/0088563 A1* | 3/2021 | Yan | G06N 3/08 |

OTHER PUBLICATIONS

Kamwa et al., "Robust Detection and Analysis of Power System Oscillations Using the Teager-Kaiser Energy Operator", Feb. 2011 (Year: 2011).*

Schaase, Alexander et al.; Localization of Acoustic Sources Based on the Teager-Kaiser Energy Operator; 18th European Signal Processing Conference (EUSIPCO-2010); pp. 2191-2195. (Year: 2010).

(Continued)

*Primary Examiner* — Omar F Fernandez Rivas
*Assistant Examiner* — Selene A. Haedi
(74) *Attorney, Agent, or Firm* — Hunton AK LLP

(57) ABSTRACT

A synchrophasor measurement-based disturbance identification method is described considering different penetration levels of renewable energy. A differential Teager-Kaiser energy operator (dTKEO)-based algorithm is first utilized to improve multiple-disturbances detection accuracy. Then, feature extractions via the integrated additive angular margin (AAM) loss and the long short-term memory (LSTM) network is described. This enables one to deal with intra-class similarity and inter-class variance of disturbances when high penetration renewable energy occurs. With the extracted features, a multi-stage weighted summing (MSWS) loss-based criterion is described for adaptive data window determination and fast disturbance pre-classification. Finally, the re-identification model based on feature similarity is established to identify unknown disturbances, a challenge for existing machine learning algorithms.

1 Claim, 13 Drawing Sheets

(56) References Cited

OTHER PUBLICATIONS

Veerasamy, Veerapandiyan et al.; LSTM Recurrent Neural Network Classifier for High Impedance Fault Detection in Solar PV Integrated Power System; 2021; IEEE Access; Special Section on Evolving Technologies in Energy Storage Systems for Energy Systems Applications; pp. 32672-32687. (Year: 2021).

Li, Zikang et al.; Fast Power System Event Identification using Enhanced LSTM Network with Renewable Energy Integration; 2021 IEEE; 11 pages. (Year: 2021).

* cited by examiner (a)

(b)

(a) Softmax Loss (b) AMM Loss (a) 40%: Softmax loss (b) 40%: AAM loss (c) 60%: Softmax loss (d) 60%: AAM loss

SYNCHROPHASOR MEASUREMENT-BASED DISTURBANCE IDENTIFICATION METHOD

BACKGROUND

Accurate and fast disturbance identification in power systems is critical for taking timely controls to avoid instability.

SUMMARY

A synchrophasor measurement-based fast and robust disturbance identification method is described considering different penetration levels of renewable energy. A differential Teager-Kaiser energy operator (dTKEO)-based algorithm is first utilized to improve multiple-disturbances detection accuracy. Then, feature extractions via the integrated additive angular margin (AAM) loss and the long short-term memory (LSTM) network is described. This enables one to deal with intra-class similarity and inter-class variance of disturbances when high penetration renewable energy occurs. With the extracted features, a multi-stage weighted summing (MSWS) loss-based criterion is described for adaptive data window determination and fast disturbance pre-classification. Finally, the re-identification model based on feature similarity is established to identify unknown disturbances a challenge for existing machine learning algorithms. Comparison results with other methods on the IEEE® 39-bus system validate the proposed method under various disturbances and renewable energy penetration levels.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
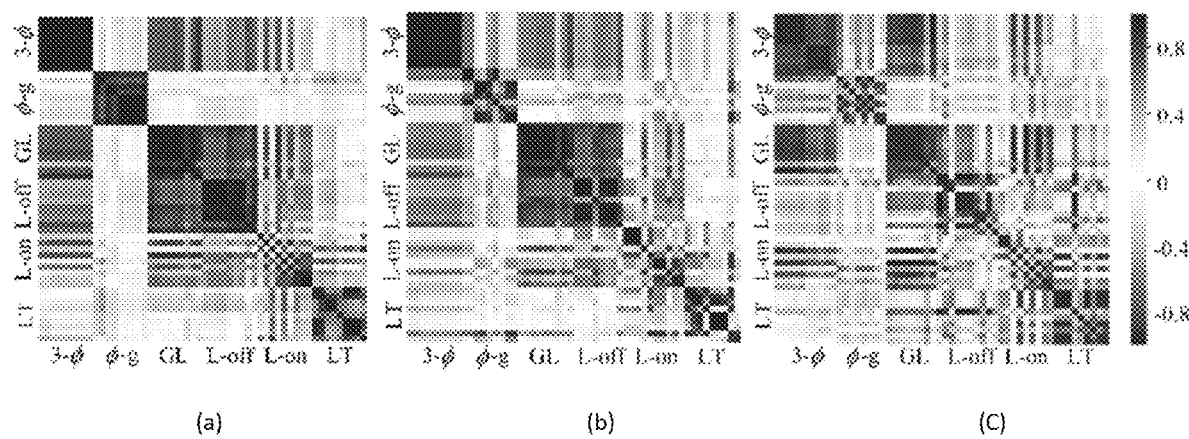
FIG. 1 shows exemplary correlation matrices between frequencies for 6 types of disturbances.

Exemplary embodiments of the invention will now be described in order to illustrate various features of the invention. The embodiments described herein are not intended to be limiting as to the scope of the invention, but rather are intended to provide examples of the components, use, and operation of the invention.

I. INTRODUCTION

With the large-scale integration of power electronic-interfaced distributed energy resources (DERs), the complexity of the power grid has been significantly increased. A local disturbance or malfunction may cause the chain reactions, leading to a large-scale blackout. Therefore, online monitoring and analysis of the disturbances play an important role in the safe and stable operation of power systems. To this end, the synchronized phasor measurement units (PMUs) have been widely adopted in today's power grid to improve visibility. PMUs allow real-time performance monitoring for power systems via faster disturbance identifications.

Disturbance identification using PMUs can be divided into two main steps: disturbance detection and classification. Some disturbance detection methods rely on the changes of certain electrical quantities from PMUs, such as frequency changes, voltage changes, and the rate of change of frequency. However, these methods are slow in response, and therefore difficult to be used to identify disturbances in the presence of oscillatory processes. To deal with that, some have considered a multiple-disturbance detection method using the Teager-Kaiser energy operator (TKEO). It is characterized by a strong response to the transient change of the signal while being only slightly affected by the electromechanical oscillations. The TKEO method is effective for accurate multiple-disturbance detection. However, if the amplitude of the oscillatory signal reaches a high level immediately after the occurrence of disturbance, it may cause error by diagnosing the signal as another disturbance.

For the disturbance classification methods, they include both model-based and data-driven ones. Model-based methods identify the disturbance category according to its triggering mechanism and are therefore difficult to be applied to large-scale systems. By contrast, the data-driven methods rely on the critical patterns without explicitly modeling the complex system. A method based on discrete wavelet transform and extended Kalman filtering can be used to detect and classify voltage events. This method is further enhanced by developing the normalized wavelet energy. The empirical mode decomposition is combined with the spectral kurtosis method to classify events and analyze signal features. By contrast, the Hilbert Huang transform and weighted bidirectional extreme learning machine are integrated to detect and classify power quality events. The latter are also investigated using the sparse recovery theory and high-dimensional convex hull approximation. The principal component analysis using frequency measurements is developed to classify events, including islanding, load outage and generation loss. The S-transform transforms both frequency and voltage signals into the frequency domain to extract typical features. The K-nearest neighbor (KNN) and support vector machine (SVM) algorithms are leveraged to identify the event types, including short-circuit fault, generator trip, and load shedding, etc. The energy similarity measurement is used to classify multiple events with a time interval of less than 150 ms. Due to the insufficient generalizability of the traditional machine learning algorithms, deep learning is advocated. The convolutional neural network is advocated to PMU data for transient events identification. A long short-term memory (LSTM) neural network, which is one of the most effective models for time series analysis, is used for power fluctuation identification.

Although there are several efforts on PMU-based disturbance classification, some challenges still exist, including inconsistent responses for the same classes of disturbances and for different classes of disturbances, i.e., inter-class variance and intra-class similarity, respectively. To handle the intra-class similarity caused by DERs integration, the diffusion kernel density estimation (DKDE) and a deep neural network (DNN) is combined. However, it does not handle the intra-class similarity issue with increased penetration of DERs. Furthermore, the existing algorithms do not address unknown disturbances.

This disclosure describes a novel enhanced LSTM for fast disturbance identification. It has the following key features:

First, the differential Teager-Kaiser energy operator (dTKEO)-based algorithm is described to improve the multiple-disturbance detection accuracy without triggering another unnecessary event as seen by the traditional TKEO;

Second, the metric learning-based additive angular margin (AAM) loss is integrated with the LSTM network to increase the efficiency of addressing intra-class similarity and inter-class variance of disturbances in the feature space. After that, the multi-stage weighted summing (MSWS) loss built upon the AAM is described to enforce monotone confidence convergence, and to achieve data window adaption and fast pre-classification; and Third, leveraging the re-identification based on the feature similarity between the disturbance data and the prediction category, the unknown disturbance classification can be achieved.

II. PROBLEMS FORMULATIONS WITH RENEWABLE ENERGY

In this section, six classes of disturbances related to active power are analyzed based on the IEEE® 39-bus system. The disturbances include three-phase short circuit (3-$\phi$Flt), single-phase-to-ground fault ($\phi$-g Flt), generation loss (GL), load switch-off (L-off), load switch-on (L-on), and line trip (LT). In power systems, the first cycle of oscillations caused by disturbance contains sufficient characteristic information for disturbance identification. Considering the frequency (1.2-2 Hz) of the first cycle of intra-area oscillations and the effects of different data windows, the data window T is selected as ½ Hz=0.5 s after extensive simulations.

A. Intra-Class Variance and Inter-Class Similarity

With increasing penetration of renewables, such as wind power and PVs, the system inertia has gradually decreased, yielding large rate of change of frequency (ROCOF). The maximum frequency deviation of a disturbance with the same power will increase as the renewable energy penetration level increases. To evaluate the effects of the frequency signal changes on disturbance classification, the correlation matrices for six types of disturbances are evaluated and presented in FIG. 1.

FIG. 1 shows exemplary correlation matrices between frequencies for 6 types of disturbances (9 samples for each type) at (a) 0%, (b) 40%, and (c) 60% penetration levels. The correlation matrix consists of Pearson correlation coefficients between different frequency signals provided by 25 PMUs with 50 Hz reporting rate at the same bus. The (i,j) element of the correlation matrix is the correlation coefficient of the i-th and the j-th PMU data, where red/blue colors indicate large positive/negative correlations, respectively. It can be found that as the penetration level of the renewables increases, the intra-class variance of disturbance data and the inter-class similarity also increase. This creates difficulties in disturbance identification as elaborated in the introduction.

B. Impacts of Fixed Data Window

Since LSTM is good at handling time series data, it is used as an example to study the impacts of a fixed data window on disturbance identification. Specifically, the LSTM is used to train the disturbance data, including the frequency and three-phase voltage amplitude data from PMUs with a data window of T=0.5 s. The identification confidence for each category at each sampling point is shown in FIG. 2.

Figure 2:
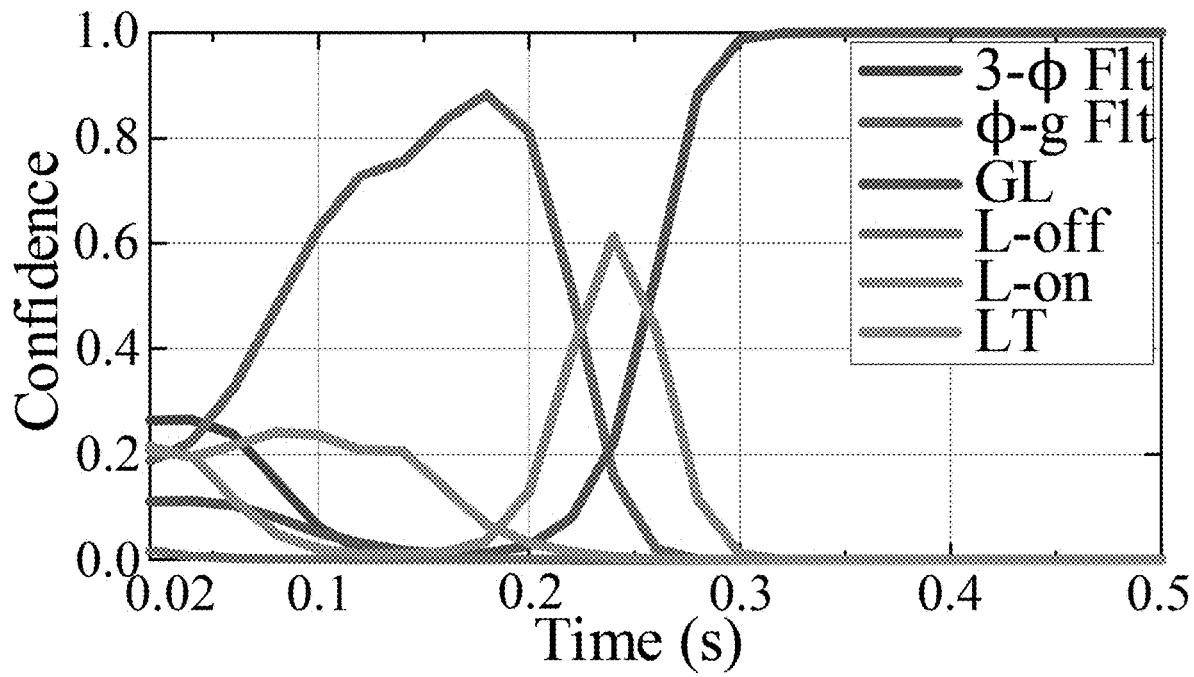
FIG. 2 shows exemplary confidence changes over time for (a) GL and (b) L-OFF.
Figure 2:
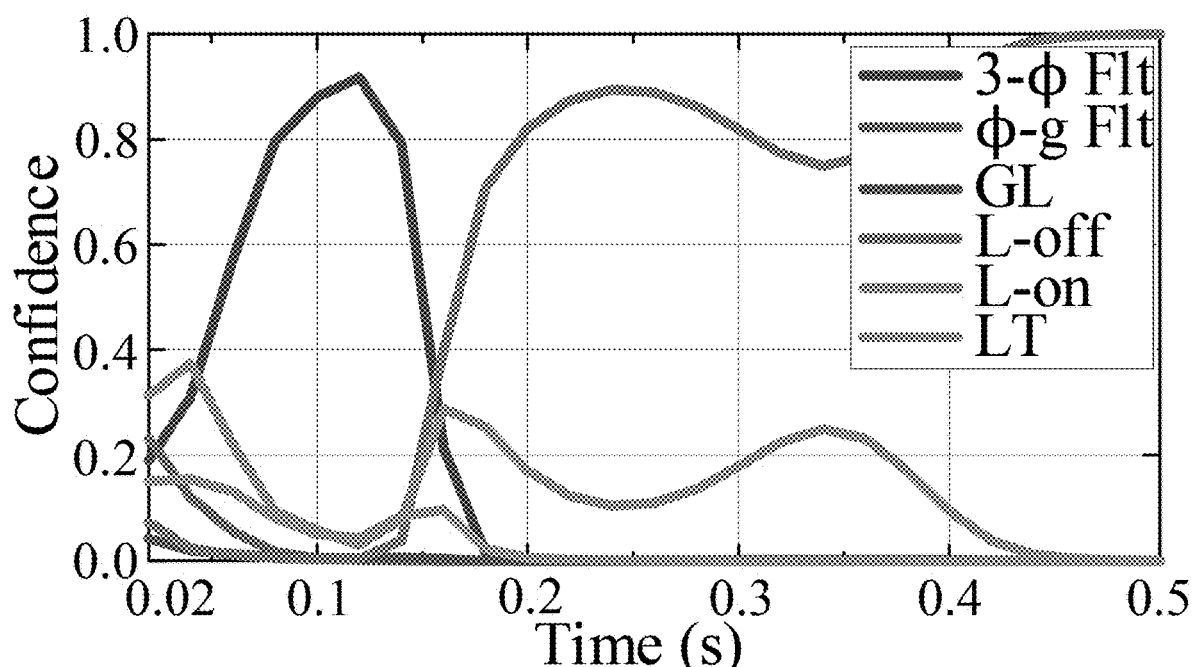

FIG. 2 shows exemplary confidence changes over time for (a) GL and (b) L-OFF. It can be observed that all identification confidences change abruptly with the accumulation of sampling points, but eventually converge. After that, the increase of the number of sampling points do not change the identification results but causes longer response time. Compared with the computing time of the method, the disturbance identification delay caused by inappropriate data window choice is more prominent for applications that require a fast response.

C. Unknown Disturbances

In practical power systems, there are always unknown disturbances. To illustrate the limitations of classification-based disturbance identification for unknown disturbances, an LSTM network trained by the six types of disturbance data is used to identify two-phase short circuit and shunt capacitor switch-on disturbances.

Figure 3:
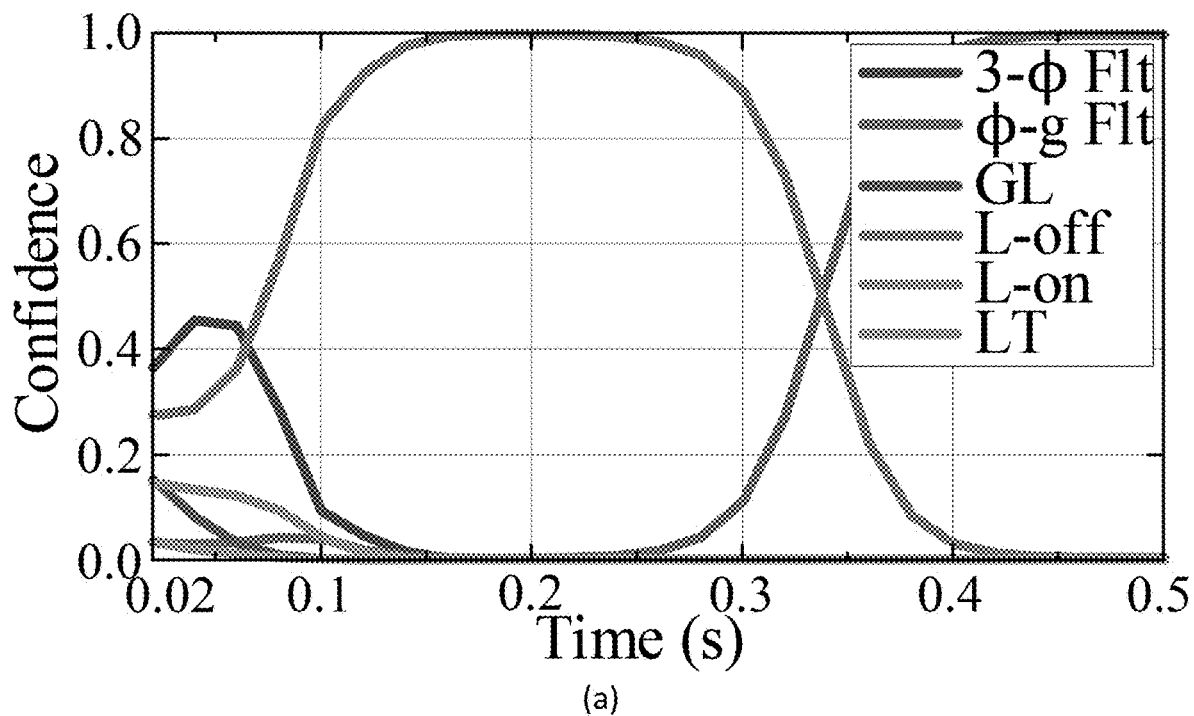
FIG. 3 shows exemplary confidence changes over time for unknown disturbances.
Figure 3:
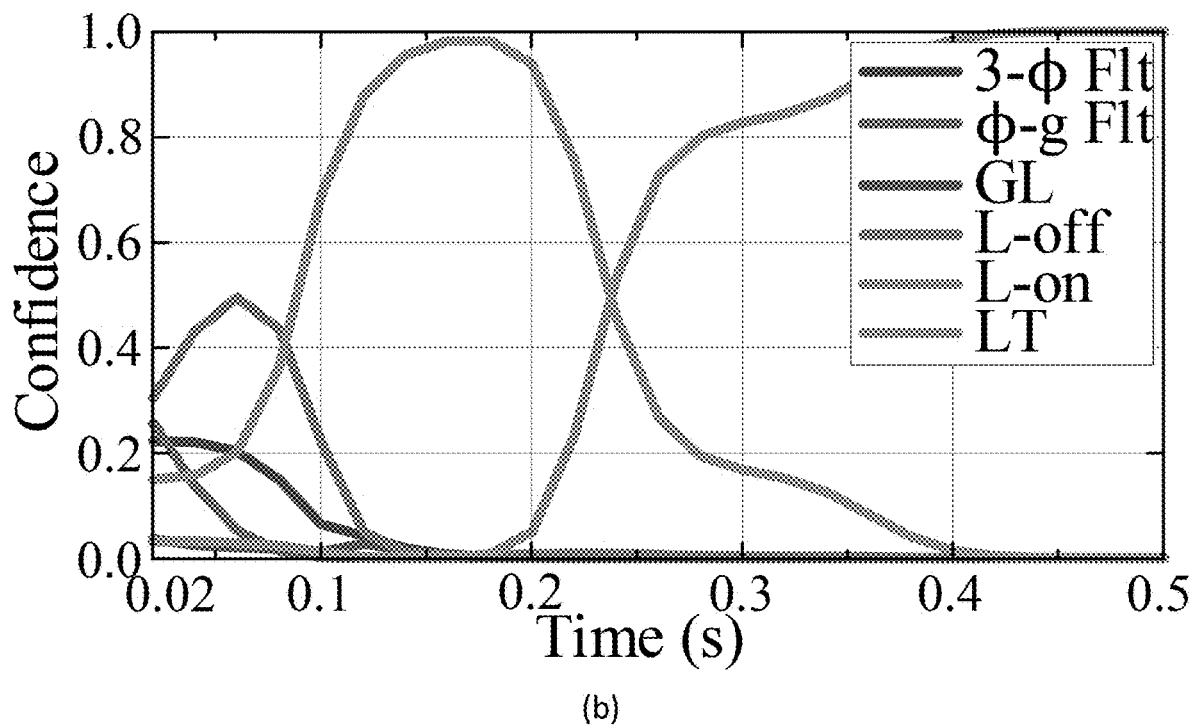

FIG. 3 shows exemplary confidence changes over time for unknown disturbances: (a) two-phase short circuit and (b) shunt capacitor switch-on. It is evident that the LSTM identifies the unknown disturbances as the most similar known disturbances in the feature space. This may trigger different controls.

III. EXEMPLARY DISTURBANCE IDENTIFICATION METHOD

Figure 4:
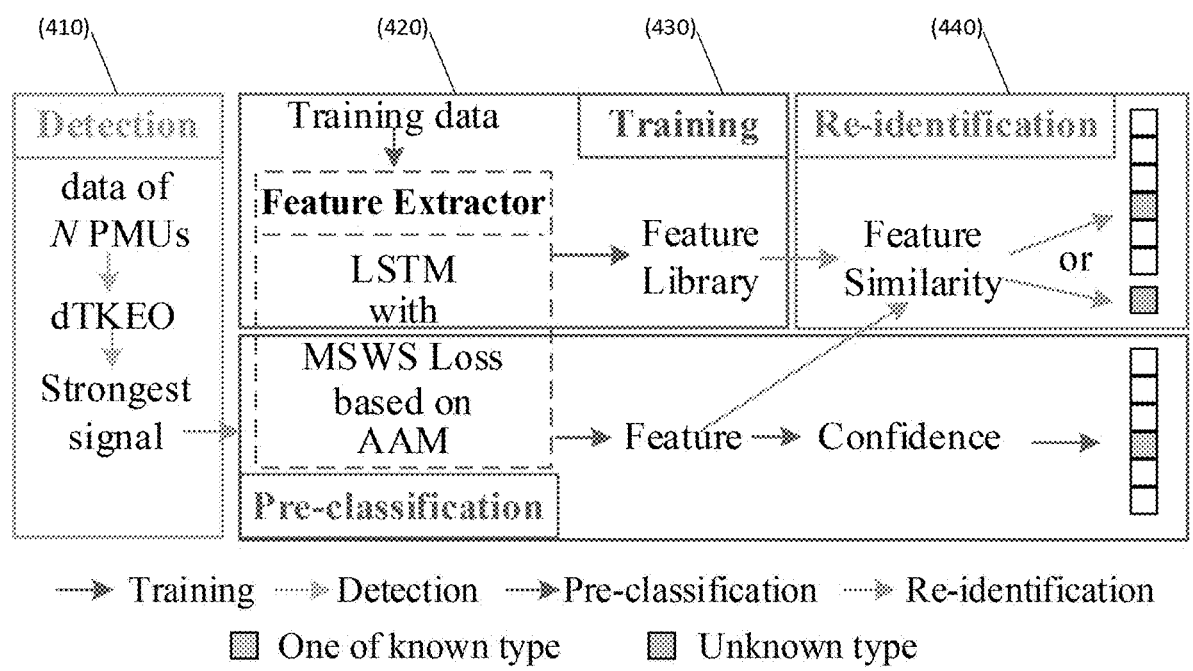
FIG. 4 shows an exemplary disturbance identification framework accordingly to an example embodiment.

To address the issues raised in Section II, a fast disturbance identification framework based on enhanced LSTM is described. FIG. 4 shows an exemplary disturbance identification framework accordingly to an example embodiment. It consists of four main steps, namely: Step 410—event detection using the enhanced dTKEO method; Step 420—model training for feature extraction by integrating the LSTM with MSWS loss and AAM; Step 430—pre-classification with accelerated monotone confidence convergence via the MSWS loss, where the data window adaption and classification are achieved by monitoring the confidence of each step; and Step 440—re-identification of unknown disturbance by comparing the similarity between the disturbance data of the features and the predicted category in the feature library.

A. DTKEO for Multiple-Disturbance Detection

The original TKEO method can be mathematically represented as $$\psi(x(n))=x^2(n)-x(n-1)x(n+1), \quad (1)$$

where $x(n)$ is a discrete signal at the n-th sample point and $\psi(x(n))$ is its instantaneous signal energy. It should be noted that after disturbances, the variation of the frequency measured by PMUs during the subsequent oscillations may continue to increase. In other words, when $x(n)$ is the measured frequency, the subsequent oscillation of the disturbance will produce a higher energy response, resulting in repeated start of the detection criterion.

In this disclosure, instead of using the direct frequency measurements, a difference operator is utilized, i.e., $x_d(n)=x(n)-x(n-1)$. Then, a dTKEO-based multiple-disturbance detection method is described, and is defined as $$\psi_{diff}(x_d(n))=[x(n)-x(n-1)]^2-[x(n-1)-x(n-2)][x(n+1)-x(n)] \quad (2)$$

When applying (2) to the frequency f measured by PMUs, $x_d(n-1)$ is much smaller than $x_d(n)$ and $x_d(n+1)$ at the time of disturbance. Thus, at the moment of the disturbance, dTKEO $\psi_{diff}(x_d(n_0))$ can be approximated as $$\psi_{diff}^{Mom}(f_d(n_0)) \approx [f(n_0)-f(n_0-1)]^2, \quad (3)$$

where $n_0$ is the the disturbance occurrence time and $f(n_0)$ is the frequency measured by the PMUs. The disturbance detection threshold $\Delta f \pm 0.024$ Hz is determined by using an approach known in the art. Thus, the disturbance detection energy threshold $\gamma$ for $\psi_{diff}^{Mom}(f_d(n_0))$ is $5.76 \times 10^{-4}$.

During the process of electromechanical oscillation after a disturbance, the change in the frequency signal measured by the PMUs can be approximated as a damped sinusoidal oscillation, i.e., $f(n)=A_n \cos(\Omega_n n+\phi_n)$. The difference operator in the oscillation process can be rewritten as $$f_d(n) = f(n) - f(n-1) \quad (4)$$
$$= A_n[\cos(\Omega_n n + \phi_n) - \cos(\Omega_n(n-1) + \phi_n)].$$

Then, the dTKEO response for the oscillation process is $$\psi_{diff}^{Osc}(f_d(n)) = 4A_n^2 \sin^2 \frac{\Omega_n}{2} \sin^2 \Omega_n \approx A_n^2 \Omega_n^4, \quad (5)$$

where $\psi_{diff}^{Osc}(f_d(n))$ is the instantaneous oscillation energy at time n; $A_n$ is the amplitude of the frequency signal; and $\Omega_n$ is the frequency of the damped oscillation. In power systems, the oscillation amplitude is normally below $\pm 0.01$ Hz within 2-5 fundamental cycles, and $\Omega_n$ is in the range of 0-2 Hz, including both inter-area and intra-area oscillations. Thus, the $\psi_{diff}^{Osc}(f_d(n))$ value calculated from (5) is in order of $10^{-8}$. This means that the dTKEO value at the moment of disturbance is significantly larger than that during the oscillation process, namely $\psi_{diff}^{Mom}(f_d(n_0)) \gg \psi_{diff}^{Osc}(f_d(n))$. Once a disturbance is detected, the spatiotemporal location can be determined using the strongest signal (SS) with the highest dTKEO value.

B. Feature Extraction Based on AAM Loss

During the training process, the loss function is used to measure the deviation between the predicted confidence distribution and the actual confidence distribution. The neural network model is constructed by minimizing the loss function. As the most widely used classification loss function, the Softmax loss is $$Loss_{Softmax} = -\frac{1}{N}\sum_{i=1}^{N} y_i \log \frac{e^{W_{y_i}^T F_i + b_{y_i}}}{\sum_{j=1}^{K} e^{W_j^T F_i + b_j}}, \quad (6)$$

where $F_i \in \mathbb{R}^{d \times 1}$ is the feature representation of the i-th sample; $y_i$ is the label of the i-th sample; $W_j \in \mathbb{R}^{d \times 1}$ is the j-th column of the category weight matrix $W \in \mathbb{R}^{d \times K}$, and b is the bias. The batch size and number of categories are N and K, respectively. The Softmax loss makes sure that all categories have the maximum target logit $W_{y_i}^T F_i + b_{y_i}$ in the probability space to generate the decision boundary for classification. However, the Softmax loss only learns separable features that are not sufficiently discriminative, which may result in poor performance for some cases, such as the disturbances with only slight differences. To deal with that, an AAM loss is advocated.

The distance metric in the AAM loss is taken as the direct optimization object. Considering the instability of Euclidean distance, the angular distance is selected. Thus, the logit is transformed as $W_j^T F_i = \|W_j\|\|F_i\|\cos\theta_j = \cos\theta_j$ by normalizing $F_i$ and $W_j$, where the bias is set as b=0 without loss of generality. At this point, the angle $\theta_j$ between $F_i$ and $W_j$ is the optimization object. The smaller the angle $\theta_j$, the closer the angular distance between $F_i$ and $W_j$, which is more helpful for classification. During the training process, the angle loss encourages features from the j-th class to have a smaller angle $\theta_j$ than others. This makes the angles between $W_j$ and the features a reliable metric for classification. The angle loss is expressed as follows:

$$Loss_{Angle} = -\frac{1}{N}\sum_{i=1}^{N} y_i \log \frac{e^{\cos\theta_{y_i}}}{e^{\cos\theta_{y_i}} + \sum_{j=1, j\neq y_i}^{K} e^{\cos\theta_j}}, \quad (7)$$

where $\theta_{y_i}$ is the angle between the feature $F_i$ of the i-th sample and the corresponding category weight $W_{y_i}$.

Based on that, an additive angular margin penalty m between $F_i$ and $W_j$ is imposed to weaken the intra-class sparsity and inter-class homogeneity. The AAM loss can then be written in the following form:

$$Loss_{AAM} = -\frac{1}{N}\sum_{i=1}^{N} y_i \log \frac{e^{\cos(\theta_{y_i}+m)}}{e^{\cos(\theta_{y_i}+m)} + \sum_{j=1, j\neq y_i}^{K} e^{\cos\theta_j}}. \quad (8)$$

Figure 5:
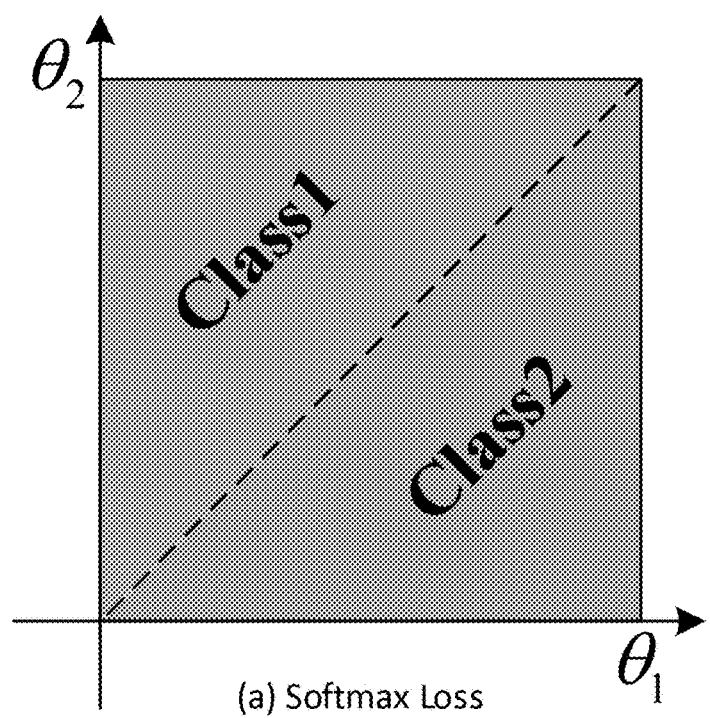
FIG. 5 shows exemplary decision margins of different loss functions for the binary classification.
Figure 5:
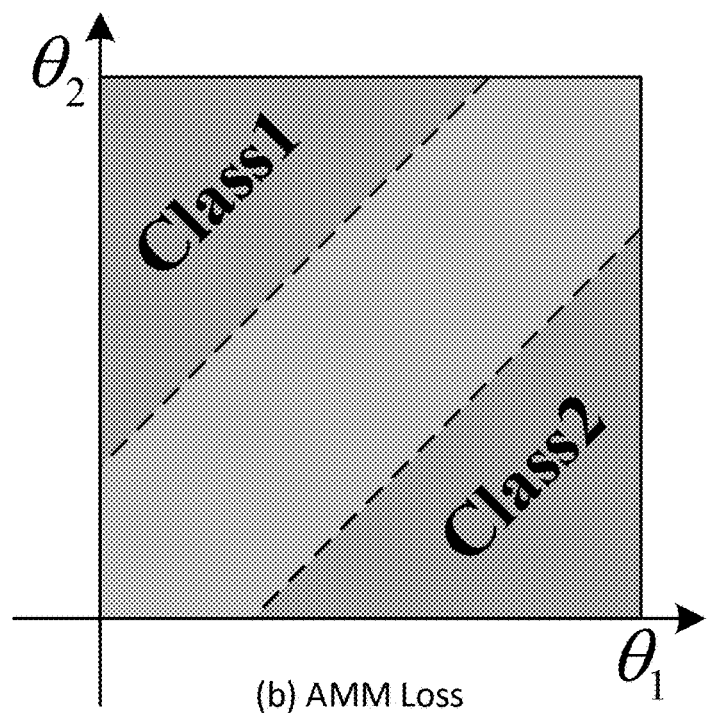

FIG. 5 shows exemplary decision margins of different loss functions for the binary classification. As an example, the feature distributions for binary classification are compared and shown in FIG. 5. The dashed lines represent decision boundaries, and the gray area is the decision margin. Compared with the Softmax loss, the decision margin generated by the AAM loss is more spacious and it simultaneously enlarges the inter-class margin and compresses the intra-class feature distribution.

C. Fast Pre-Classification with an Adaptive Data Window

1) Multi-Stage Weighted Summing Loss

The traditional LSTM network constructs the loss function with the loss at the final moment, ignoring those in the intermediate moments. Therefore, the information of each PMU data point cannot be explored thoroughly, which leads to the slow convergence of identification confidence. An MSWS loss structure, which considers the loss at each time in the entire data window is therefore described.

The MSWS loss based on the AAM in the adaptive LSTM training is defined as follows:

$$Loss_{AAM}^{MSWS} = Loss_{AAM}^T + Loss_{AAM}^C(n) \quad (9)$$

-continued $$= Loss_{AAM}^T + \lambda \frac{1}{n-1} \sum_{1}^{n-1} \frac{i}{n-1} Loss_{AAM}^j,$$

where $Loss_{AAM}^T$ represents the AAM loss at the last timepoint of the sampling data, and $Loss_{AAM}^C(n)$ is the summed AAM loss accumulating from the starting point to the n-th point. The AAM loss at each timepoint is weighted by $$\frac{i}{n-1}$$

to set higher penalty to more recent ones. Additionally, $\lambda$ is the weight of $Loss_{AAM}^C(n)$. Via the MSWS loss, the LSTM network can accelerate the monotone convergence of confidence without deteriorating the accuracy.

2) Improved LSTM with an Adaptive Data Window

Figure 6:
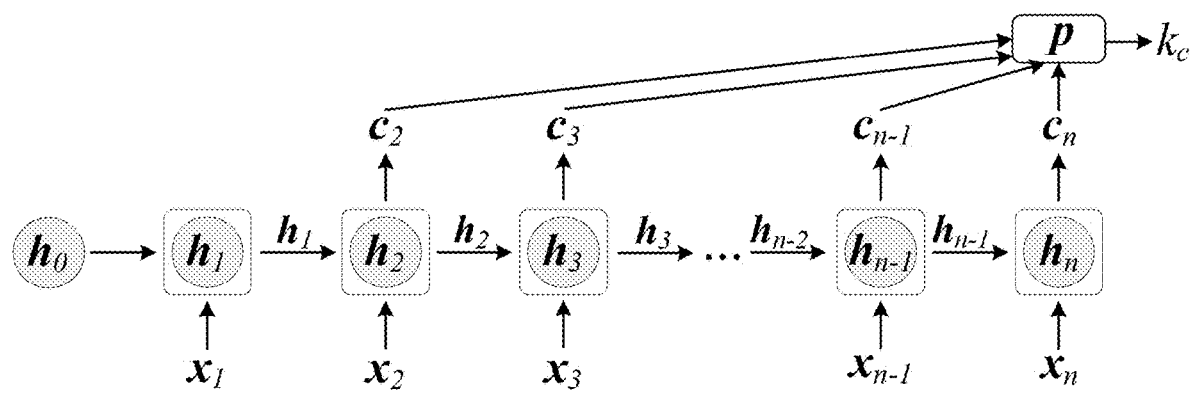
FIG. 6 shows an exemplary architecture of an adaptive LSTM.

FIG. 6 shows an exemplary architecture of an adaptive LSTM. LSTM is a special variant of a recurrent neural network (RNN). However, unlike the RNN, an LSTM network can selectively add new information and forget previously accumulated information by introducing a gate unit to solve the long-term dependence of RNNs in time series analysis. The inputs of traditional classification-based LSTM networks are time series data, and the label is output at the last sampling point of the series. This limits the possibility of obtaining the identification information of the intermediate time. To allow fast identification, an adaptive LSTM model is described, as illustrated in FIG. 6.

For the adaptive LSTM, it is assumed that the input of the LSTM at sampling datapoint i is $x_i$, where $x_i \in i^{4 \times 1}$ includes frequency and three-phase voltage magnitudes data. For the i-th LSTM cell, $$h_i = \sigma(Ux_i + Wh_{i-1} + b_h), \quad (10)$$

$$c_i = \text{Softmax}(Vh_i + b_o) = [c_i^1, c_i^2, K, c_i^K[, \quad (11)$$

where $h_i$ is the hidden layer state; $c_i$ is the classification confidence predicted by the LSTM using historical information before sampling datapoint i; U, W, and V are the weights; $b_h$ and $b_o$ are the biases; Softmax is a function that maps a vector to a probability distribution, and $\sigma$ is an activation function that uses the following sigmoid function $$\text{Sigmoid}(z) = \frac{1}{1 + e^{-z}}, \quad (12)$$

where z is the input vector.

In the pre-classification phase, the confidence $c_i$ of each sampling point $x_i$ is the output over time. Let the confidence threshold vector $c=[c^1, c^2, K, c^K]$, where $c^k$ is the confidence threshold of the k-th class. For the i-th sampling point, the confidence $c_i^k$ is compared with $c^k$. Once the confidence threshold of one category is reached when scanning over the sequence data, the process can be stopped, and the category $k_c$ will be the result of pre-classification.

Figure 7:
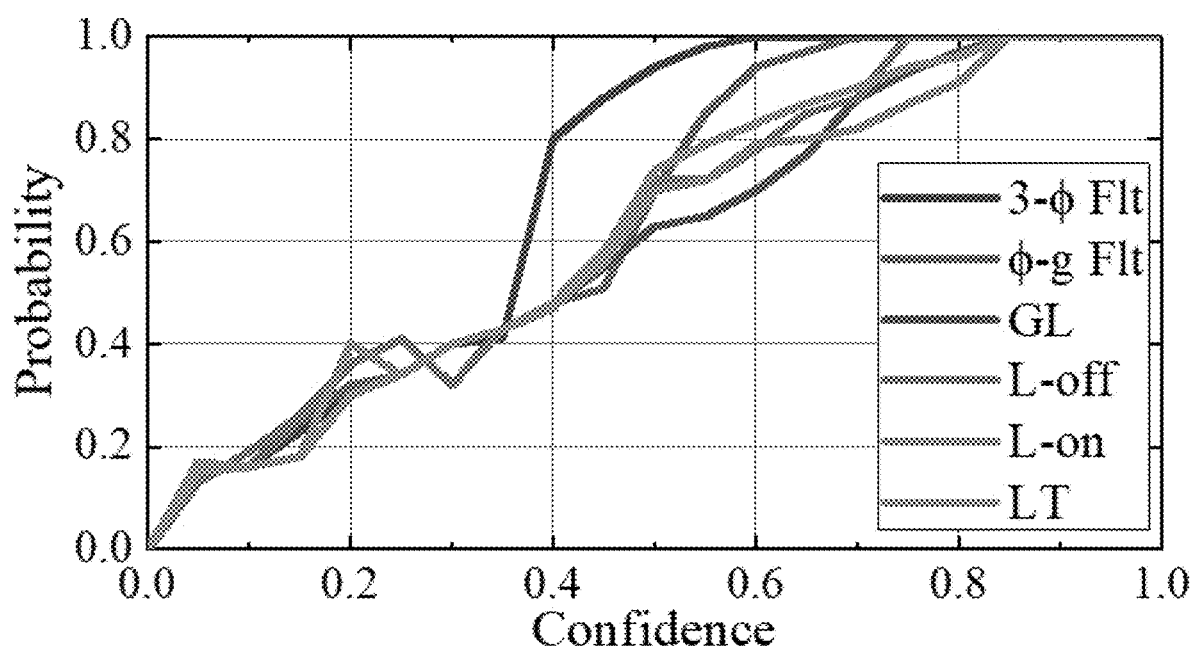
FIG. 7 shows exemplary confidence probabilities for 6 classes of disturbance.

To determine a reasonable confidence threshold to meet the early stop of the LSTM, the classification confidence level with the same prediction as the model is analyzed. The LSTM is trained by the disturbance data with a fixed data window n, and the classification confidence $c_i$ at each time is recorded. The relationship between the classification confidence and the accuracy of the prediction category on six types of disturbance is analyzed. FIG. 7 shows exemplary confidence probabilities for 6 classes of disturbance. As presented in FIG. 7, for each disturbance type, the x-axis represents the confidence with which the model predicts the disturbance data to be this type at the current time, while they-axis is the probability that the prediction result at the final time is of this class. When the probability of each category is 1 for the first time, the confidence threshold vector c=[0.6, 0.7, 0.75, 0.85, 0.85, 0.85] can be chosen.

D. Unknown Disturbance Re-Identification Using Feature Similarity

Based on the feature space constructed using the MSWS loss, the minimum feature similarity vector $s=[s^1, s^2, \ldots, s^K]$ is $$s^k = \text{mincos} \frac{F_i \cdot F_j}{\|F_i\|\|F_j\|}, F_i, F_j \in k\text{-th type \&\& } i \neq j, \quad (13)$$

where $F_i$ and $F_j$ are the features extracted by the model.

In the re-identification phase, the feature F extracted from the disturbance data by the LSTM network is fed to the classifier to obtain the pre-classification result $k_c$. The similarity between F and the $k_c$-th type disturbance feature is then calculated. If (14) is satisfied, the disturbance is considered to be unknown.

$$\text{mincos} \frac{F \cdot F_1}{\|F\|\|F_i\|} < s^{k_c}, \forall F_i \in k_c\text{-th type} \quad (14)$$

E. Flowchart of the Described Method

Figure 8:
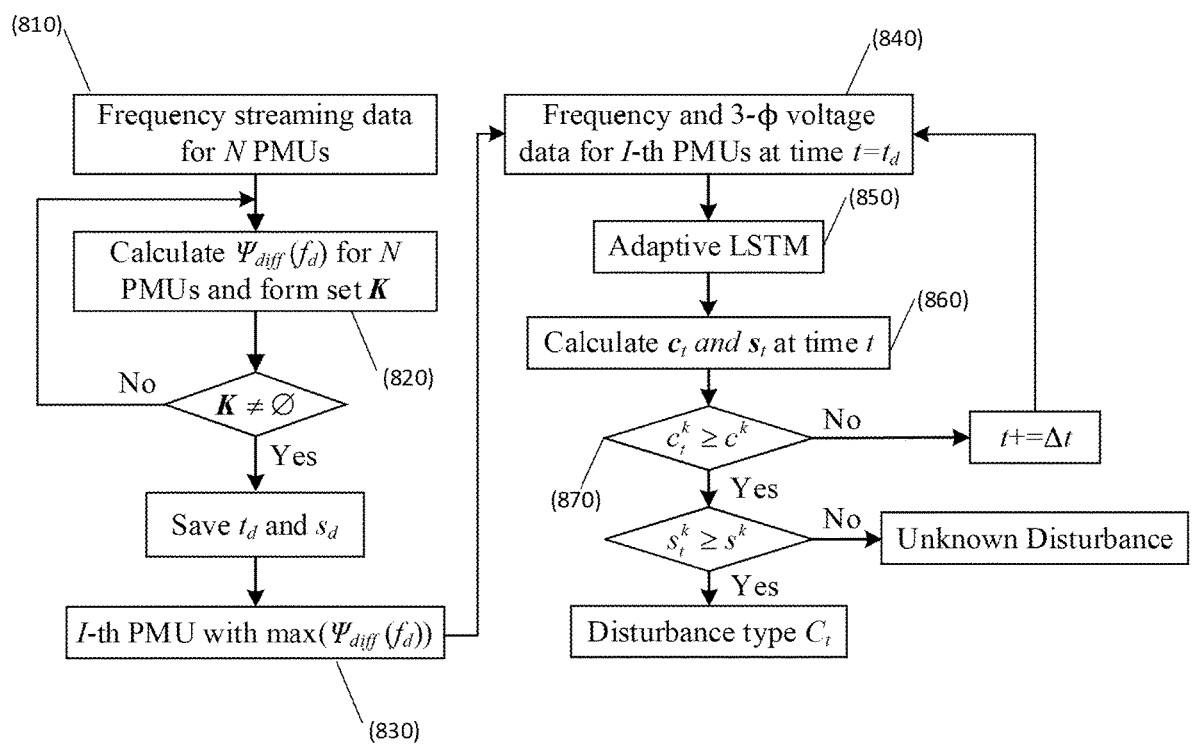
FIG. 8 shows an exemplary flowchart according to an example embodiment of the present disclosure.

FIG. 8 shows an exemplary flowchart according to an example embodiment of the present disclosure. In one example embodiment, in a step 810, a computer (or server) receives a stream of data from a power network including a plurality of PMUs.

In a step 820, the computer detects an event using the enhanced dTKEO method, which can be mathematically represented as $$\psi_{diff}^{Osc}(f_d(n)) = 4A_n^2 \sin^2 \frac{\Omega_n}{2} \sin^2 \Omega_n \approx A_n^2 \Omega_n^4, \quad (5)$$

where $\psi_{diff}^{Osc}(f_d(n))$ is the instantaneous oscillation energy at time n; $A_n$ is the amplitude of the frequency signal; and $\Omega_n$ is the frequency of the damped oscillation.

In a step 830, a PMU with the maximum instantaneous oscillation energy at time n can be identified, and in step 840, the computer collects frequency and voltage data for the PMU to provide the frequency and voltage to a model in step 850.

In one example embodiment, the model is trained for feature extraction by integrating the long short-term memory (LSTM) with multi-stage weighted summing (MSWS) loss and additive angular margin (AAM). Specifically, a neural network model is constructed by minimizing a loss function. During the training process, the loss function is used to measure the deviation between the predicted confidence distribution and the actual confidence distribution. The loss function can be the AAM loss which can then be written in the following form:

$$Loss_{AAM} = -\frac{1}{N}\sum_{i=1}^{N} y_i \log \frac{e^{\cos(\theta_{y_i}+m)}}{e^{\cos(\theta_{y_i}+m)} + \sum_{j=1,j\neq y_i}^{K} e^{\cos\theta_j}}. \quad (8)$$

where $F_i \in i^{d\times 1}$ is the feature representation of the i-th sample; $y_i$ is the label of the i-th sample; $W_j \in i^{d\times 1}$ is the j-th column of the category weight matrix $W \in i^{d\times K}$; and the angle $\theta_j$ is between $F_i$ and $W_j$.

Next, via the MSWS loss, the LSTM network can accelerate the monotone convergence of confidence without deteriorating the accuracy. The MSWS loss based on the AAM in the adaptive LSTM training is defined as follows:

$$Loss_{AAM}^{MSWS} = Loss_{AAM}^T + Loss_{AAM}^C(n) \quad (9)$$

$$= Loss_{AAM}^T + \lambda \frac{1}{n-1}\sum_{1}^{n-1} \frac{i}{n-1} Loss_{AAM}^i,$$

where $Loss_{AAM}^T$ represents the AAM loss at the last timepoint of the sampling data, $Loss_{AAM}^C(n)$ is the summed AAM loss accumulating from the starting point to the n-th point, and $\lambda$ is the weight of $Loss_{AAM}^C(n)$.

Next, in step 860, for the adaptive LSTM, it is assumed that the input of the LSTM at sampling datapoint i is $x_i$, where $x_i \in i^{4\times 1}$ includes frequency and three-phase voltage magnitudes data. For the i-th LSTM cell, $$h_i = \sigma(Ux_i + Wh_{i-1} + +b_h), \quad (10)$$

$$c_i = \text{Softmax}(Vh_i + b_o) = [c_i^1, c_i^2, K, c_i^K], \quad (11)$$

where $h_i$ is the hidden layer state; $c_i$ is the classification confidence predicted by the LSTM using historical information before sampling datapoint i; U, W, and V are the weights; $b_h$ and $b_o$ are the biases; Softmax is a function that maps a vector to a probability distribution, and σ is an activation function that uses the following sigmoid function $$\text{Sigmoid}(z) = \frac{1}{1+e^{-z}}, \quad (12)$$

where z is the input vector.

To determine a reasonable confidence threshold to meet the early stop of the LSTM, the LSTM is trained by the disturbance data with a fixed data window n, and the classification confidence $c_i$ at each time is recorded.

Next, in step 870, in a pre-classification phase, the confidence $c_i$ of each sampling point $x_i$ is the output over time. Let the confidence threshold vector $c=[c^1, c^2, K, c^K]$, where $c^k$ is the confidence threshold of the k-th class. For the i-th sampling point, the confidence $c_i$ is compared with $c^k$. Once the confidence threshold of one category is reached when scanning over the sequence data, the process can be stopped, and the category $k_c$ will be the result of pre-classification.

In one example embodiment, in a re-identification phase, the feature F extracted from the disturbance data by the LSTM network is fed to the classifier to obtain the pre-classification result $k_c$. The similarity between F and the $k_c$-th type disturbance feature is then calculated. If (14) is satisfied, the disturbance is considered to be unknown.

$$\min \cos \frac{F \cdot F_1}{\|F\|\|F_i\|} < s^{k_c}, \forall F_i \in k_c\text{-th type} \quad (14)$$

The adaptive classification of known disturbances is realized according to the identification confidence accumulated at the current moment, and is followed by the re-identification of unknown disturbances based on the feature similarity.

Identification and analysis of power system disturbances are important to pinpoint the causes of the abnormal system operation. Accurate disturbance identification in real time can implement effective power system security and stability control before any isolated faults escalate to cascading blackouts.

IV. CASE STUDIES

To further evaluate the performances of the described method for unknown disturbances in addition to the previously analyzed six classes of common disturbances, two-phase short circuit (2-φFlt) and two classes of disturbances related to reactive power, namely shunt capacitor switch-on (SC-on) and shunt capacitor switch-off (SC-off), are considered. The disturbance detection energy threshold γ is $5.76\times10^{-4}$.

A. Simulation Settings of the IEEE 39-Bus System

To investigate the impacts of increased renewable energy penetrations on disturbance identification, various simulations on the IEEE® 39-bus system are performed with different wind power penetration levels. In the simulations, the thermal power unit is replaced by DFIG with the same capacity and the details can be found in Table I.

TABLE I
SIMULATION SETTINGS WITH DIFFERENT WIND POWER PENETRATIONS

| Wind power penetration | Thermal power units replaced by wind farms |
|---|---|
| 20% | 33, 36 |
| 40% | 30, 32, 33, 36, 37 |
| 60% | 30, 33, 34, 36, 37, 38 |

TABLE II
DIFFERENT DISTURBANCES AND SIMULATION METHODS

| | Disturbance | Simulation setting |
|---|---|---|
| Known | 3-φ Flt events | Flt on each line: FL 0.1-1 p.u, FCT 0.1 s |
| | φ-g Flt events | Flt on each line: FL 0.1-1 p.u, FCT 0.1 s, TR (0, 5, and 30 Ω) |
| | GL events: | Each Generator: −0.1 to −1 p.u MW loss |
| | L-off events: | Each load: −0.1 to −1 p.u MW loss |
| | L-on events: | Each load: +0.1 to +1 p.u MW gain |
| | LT events | Each line: Switching off all lines |
| Unknown | 2-φ Flt events | Flt on each line: FL 0.1-1 p.u, FCT 0.1 s |
| | SC-on events | SC at each bus: +0.1 to +1 p.u MVAR gain |
| | SC-off events | SC at each bus: −0.1 to −1 p.u MVAR loss |

The simulation time is 30 s, and the disturbances are applied at 5 s. Considering that the PMU reporting rate is 50 Hz, the simulation step size is set to be 0.02 s. To simulate the actual power system measurements, 60 dB of Gaussian white noise is added. For the known disturbances, a total number of 7456 disturbances, including 1864 simulated disturbances for 4 penetration levels (0%-60%) are generated. The proportions of the training set, the validation set, and the test set were 0.6, 0.2, and 0.2 respectively. For the unknown disturbances, a total number of 4480 disturbances, including 1120 simulated disturbances for 4 penetration levels (0%-60%) are generated. The simulation settings of various disturbances are listed in Table II, where FL, FCT, TR indicate fault location, fault clear time, and transitional resistance, respectively.

The performances of the proposed algorithm are evaluated by the following measures:
1) False detection rate (FDR): the ratio between the number of disturbances that do not happen but are detected and the number of total disturbances;
2) Missing detection rate (MDR): the ratio between the number of disturbances that occurs but are not detected and the number of total disturbances;
3) Trigger number (TN): the number of detection criteria triggers per detected disturbance;
4) $K_{in}$-identification rate ($K_{in}$-IR): the ratio between the number of K classes of known disturbances that are correctly detected and identified and the number of K categories of disturbances that are correctly detected;
5) $K_{out}$-identification rate ($K_{out}$-IR): the ratio between the number of non-K classes of unknown disturbances that are correctly detected and identified, and the number of non-K categories of unknown disturbances that are correctly detected;
6) Identification delay time (ILT): the time deviation between the identification completion and disturbance occurrence.

B. Results Analysis

1) Results for Multiple-Disturbance Detection

To highlight the advantages of dTKEO over TKEO, the disturbance detection results of them with different renewable energy penetration levels are shown in Table III. It can be observed that with increased penetration level of renewables, the FDR and TN gradually increase and the MDR gradually decreases. Both methods have a high detection accuracy. However, compared with TKEO, dTKEO has a very low TN, and it avoids the repeated triggering to the same disturbance.

TABLE III

COMPARISON RESULTS OF TKEO AND
$_D$TKEO FOR INCREASING RENEWABLE PENETRATIONS

| Penetration | | 0% | 20% | 40% | 60% |
|---|---|---|---|---|---|
| TKEO | FDR (%) | 0.11 | 0.27 | 0.43 | 0.8 |
|  | MDR (%) | 0.7 | 0.48 | 0.38 | 0.16 |
|  | TN | 1.29 | 1.89 | 2.59 | 3.81 |
| dTKEO | FDR (%) | 0.11 | 0.16 | 0.27 | 0.59 |
|  | MDR (%) | 0.7 | 0.59 | 0.41 | 0.16 |
|  | TN | 1.0016 | 1.0022 | 1.0043 | 1.008 |

2) Results for Feature Distribution

With the increased renewable penetrations, the dynamic characteristics of disturbance will exhibit the intra-class variance and inter-class similarity. To show that the proposed method can deal with that in the feature space, the feature distribution and angle distribution of all positive and negative pairs are used. The angle distribution is described as follows.

Based on the feature space trained using different loss functions, the similarity of two sample feature vectors is defined as $S_{ij}=|F_i||F_j|\cos \theta_{ij}=\cos \theta_{ij}$, where $\theta_{ij}$ is the angle between $F_i$ and $F_j$. When $y_i=y_j$, the feature pair $(F_i,F_j)$ is positive; otherwise, it is negative. The maximum positive pair angle reflects the intra-class variance of disturbances in the feature space. The smaller the maximum positive pair angle, the smaller the intra-class variance. In addition, the angular margin is denoted by the overlap of the positive pair angle distribution and negative pair angle distribution. The smaller the angular margin, the smaller the inter-class similarity.

Figure 9:
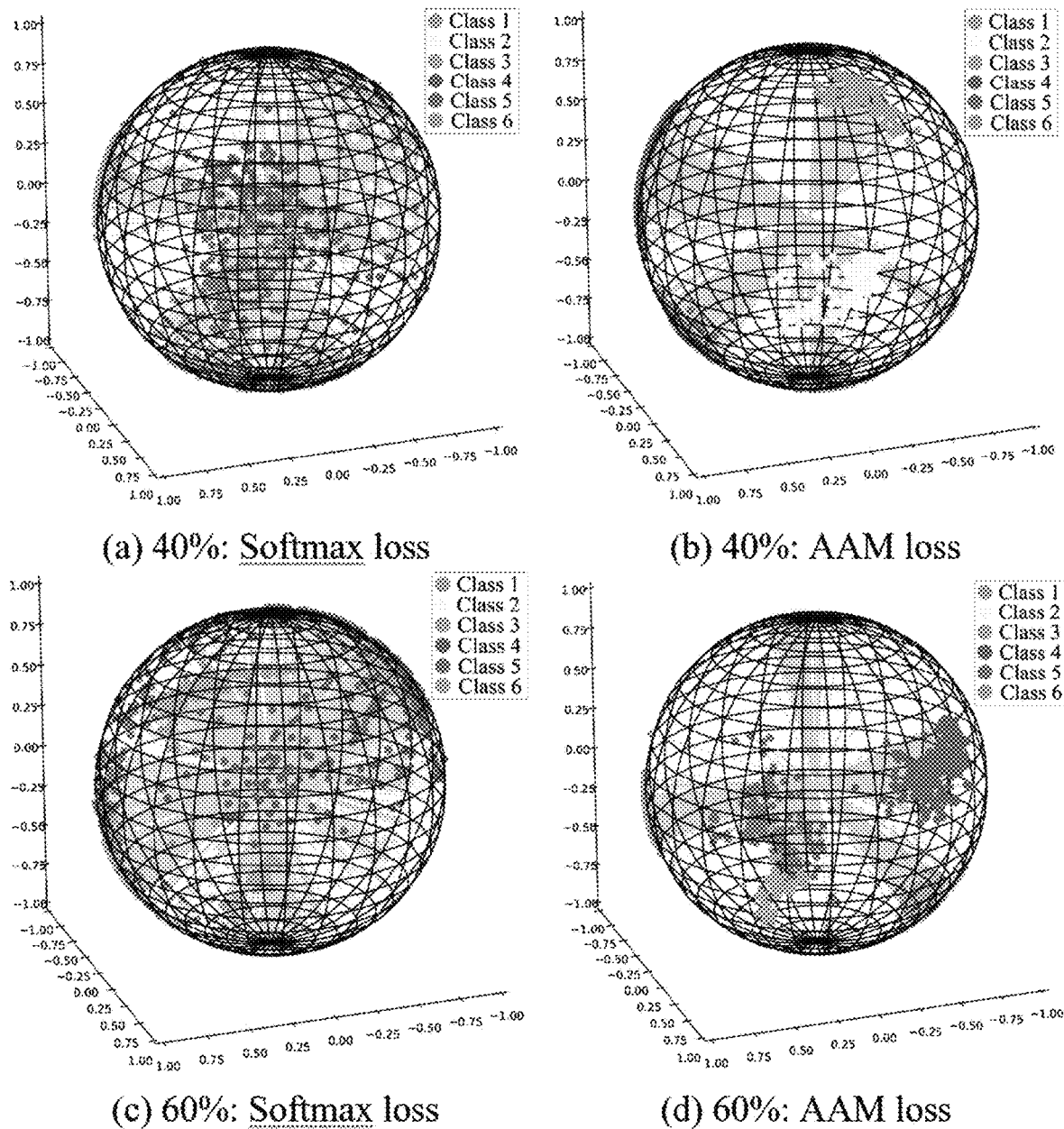
FIG. 9 shows example feature distributions of different renewable penetration levels using different loss functions.
Figure 10:
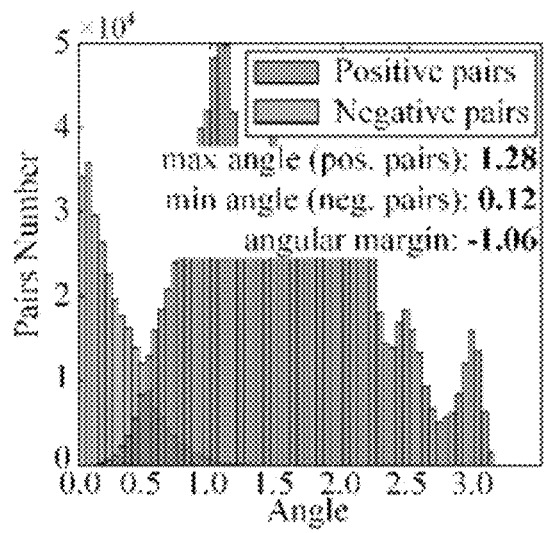
FIG. 10 shows example angle distributions of different renewable penetration levels using different loss functions.
Figure 10:
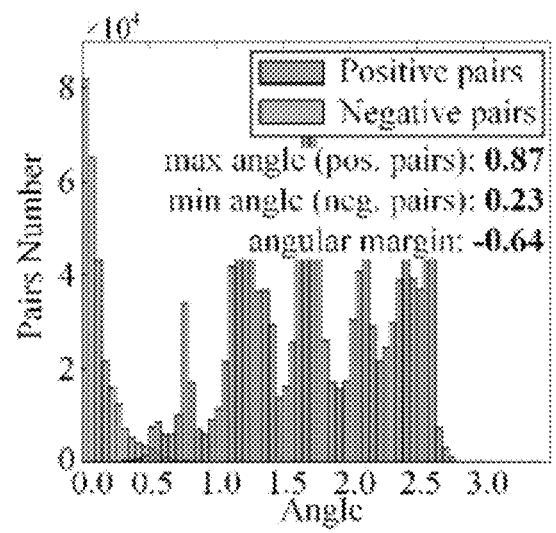
Figure 10:
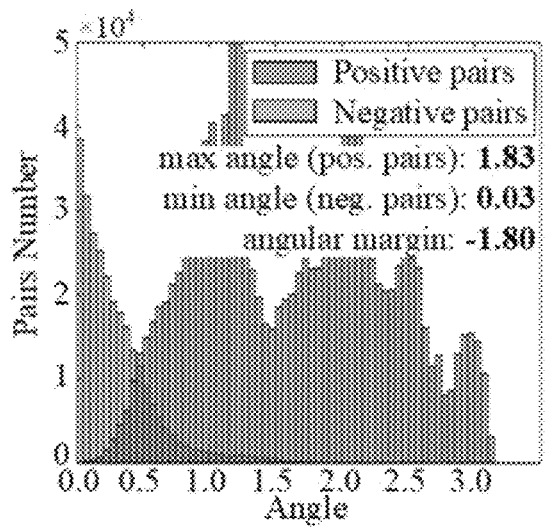
Figure 10:
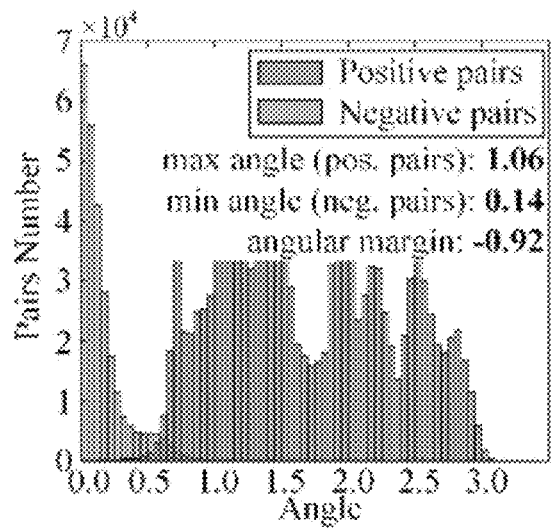

FIG. 9 shows example feature distributions of different renewable penetration levels using different loss functions. FIG. 10 shows example angle distributions of different renewable penetration levels using different loss functions. In FIGS. 9 and 10, classes 1, 2, 3, 4, 5, and 6 correspond to 3-φFlt, φ-g Flt, GL, L-off, L-on, and LT, respectively. As can be seen from FIG. 9, for the power system with high renewable penetration, the degree of overlap between different disturbance features learned by Softmax gradually increases. By contrast, the proposed method could still distinguish different disturbances.

It is evident from FIG. 10 that compared with the Softmax loss, the feature extraction method based on AAM loss has a smaller maximum positive pair angle and angular margin. This indicates that the proposed feature extraction method is more robust to intra-class variance and inter-class similarity caused by increasing penetration of renewable energy.

3) Accelerated Monotone Confidence Convergence

Figure 11:
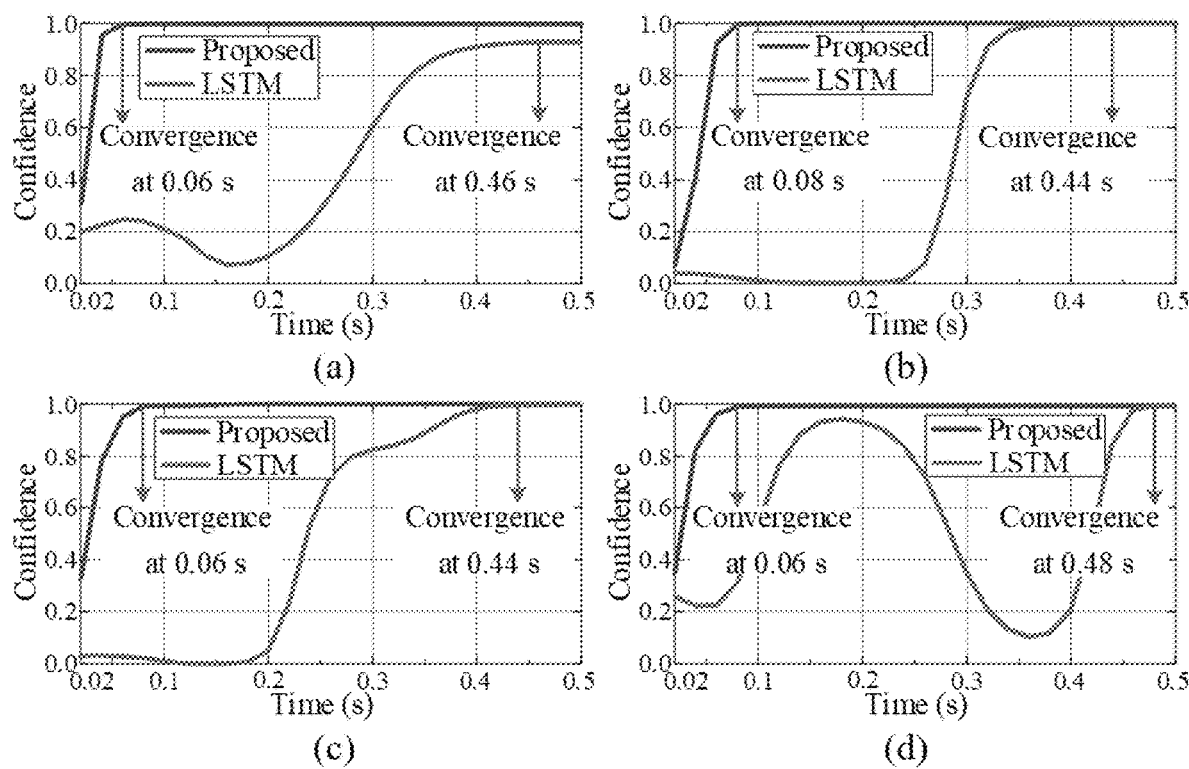
FIG. 11 shows exemplary comparison of confidence convergence using different methods.

FIG. 11 shows exemplary comparison of confidence convergence using different methods for (a) 3-Flt, (b) GL, (c) L-OFF, and (d) LT. The confidence predicted by LSTM and the described model in the entire data window is presented in these FIGS. Taking FIG. 11(a) as an example, the confidence convergence times of the original LSTM and the MSWS loss-based LSTM are 0.06 s and 0.46 s, respectively. This demonstrates that the MSWS loss can accelerate the monotone convergence of the identification confidence of the model for the disturbance data and reduce the identification data window.

4) Results for Known Disturbances

Figure 12:
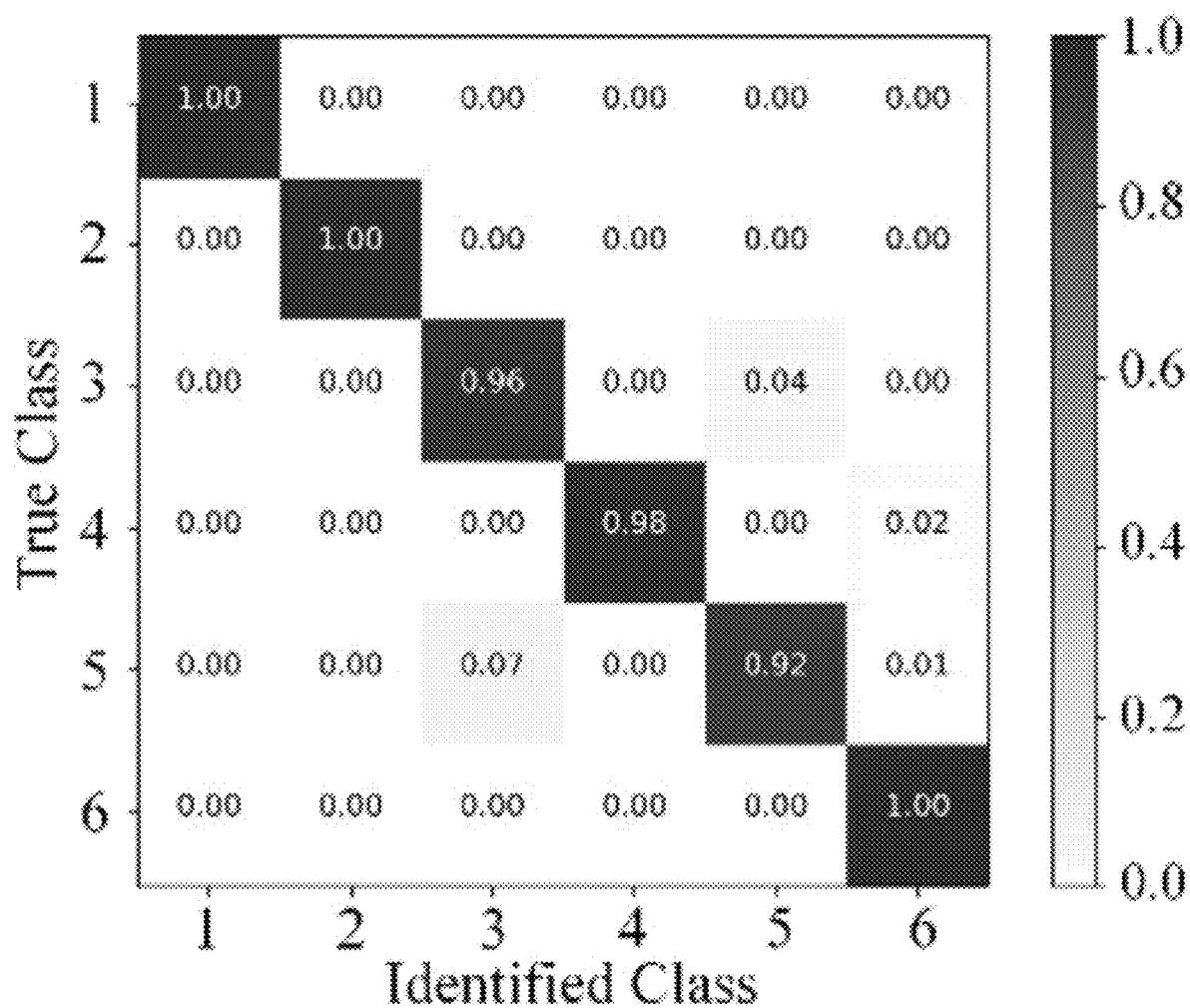
FIG. 12 presents an exemplary confusion matrix.

FIG. 12 presents an exemplary confusion matrix of the described method for the known disturbance test sets considering renewable energy. Here, 1, 2, 3, 4, 5, and 6 respectively correspond to 3-φFlt, φ-g Flt, GL, L-off, L-on, and LT. Due to the similarity of the dynamic characteristics of L-on events and GL events, the accuracy of L-on is relatively low. The overall accuracy of the test data is 98.79%, which indicates that the proposed method achieves a good performance for disturbance identification with renewable energy integrations.

To highlight the advantages of the described method over other methods, other conventional machine learning methods and the diffusion kernel density estimation (DKDE)-based DNN (DKDE+DNN) are compared under different levels of renewable energy penetrations. The data windows for the conventional machine learning methods and DKDE+DNN are set to 0.5 s and 0.2 s, respectively. Table IV presents the index $K_{in}$-IR obtained by various methods. From Table IV, it is evident that the performance of the LSTM is better than that of the traditional machine learning methods and the DNN, see the comparisons between DNN+Softmax and LSTM+Softmax. Without any renewable energy, the DKDE+DNN achieves slightly better performance than the described method. However, with increased penetration level of renewable energy, the described method yields much better results. This is because the feature extraction based on AAM loss can effectively learn discriminative features under different scenarios.

TABLE IV

$K_{IN}$-IR (%) WITH VARIOUS METHODS FOR INCREASING PENETRATION LEVEL OF RENEWABLE ENERGY

| Penetration | DT | RF | SVM | DNN + Softmax | LSTM + Softmax | DNN + AAM | DKDE + DNN | Proposed Method |
|---|---|---|---|---|---|---|---|---|
| 0% | 93.23 | 94.59 | 94.05 | 96.76 | 97.30 | 98.11 | 97.84 | 99.73 |
| 20% | 92.72 | 94.34 | 93.80 | 96.50 | 97.04 | 97.84 | 97.30 | 99.46 |
| 40% | 89.78 | 92.20 | 91.93 | 93.82 | 94.89 | 95.97 | 95.43 | 98.66 |
| 60% | 83.33 | 84.14 | 82.80 | 89.52 | 90.05 | 94.09 | 93.82 | 97.31 |

TABLE V

SIMULATION RESULTS CONSIDERING UNKNOWN DISTURBANCES

| Penetration | FDR (%) | MDR (%) | TN | $K_{out}$-IR (%) |
|---|---|---|---|---|
| 0% | 0.09 | 0.63 | 1.0027 | 99.55 |
| 20% | 0.27 | 0.36 | 1.0054 | 99.10 |
| 40% | 0.36 | 0.18 | 1.0081 | 98.66 |
| 60% | 0.54 | 0.09 | 1.0117 | 97.78 |

5) Results for Unknown Disturbances

It should be noted that the existing classification-based methods do not have the capability of handling unknown disturbances, the $K_{out}$-IR of the compared methods in Table IV will be all 0. By contrast, the described method is able to classify the unknown disturbances. To demonstrate that, the unknown disturbance data are tested, and the results are shown in Table V. From Table V, it can be concluded that the re-identification strategy allows the described method to deal with unknown disturbances and achieve high accuracies, see the $K_{out}$-IR index.

TABLE VI

IDENTIFICATION DELAY TIME OF THE PROPOSED METHOD

| | DW (ms) | CT (ms) | IDT (ms) |
|---|---|---|---|
| 3-φ Flt events | 56.21 | 5.32 | 61.53 |
| φ-g Flt events | 47.82 | 6.05 | 53.87 |
| GL events | 76.38 | 4.31 | 80.69 |
| L-off events | 55.94 | 6.48 | 62.42 |
| L-on events | 87.21 | 6.69 | 93.90 |
| LT events | 83.66 | 4.67 | 88.33 |
| Average | 67.87 | 5.59 | 73.46 |

6) Identification Delay Times

The identification delay time (IDT) consists of the identification data window (DW) and computing time (CT) of the algorithm. Table VI presents the IDT of each category. The total IDT is 73.46 ms, including 67.87 ms for the identification DW, and 5.59 ms for the CT. The described method is implemented in Python and the simulations are conducted on a computer with an i7-8700 k 3.7 GHz CPU, NVIDIA® GTX 1080Ti GPU, and 16 GB RAM. The results demonstrate that the described method can identify different types of disturbances with much smaller delay as compared to the conventional machine learning methods (500 ms) and DKDE+DNN (200 ms).

V. CONCLUSION

This disclosure presents a fast and robust method for disturbance detection and identification with different levels of renewable energy penetrations. It leverages the PMU data as well as enhanced dTKEO for multiple disturbance detection while developing an enhanced integrated LSTM model for disturbance identification. In particular, the AAM loss is used together with LSTM for better feature extractions, including the intra-class similarity and inter-class variance of disturbances when high penetration renewable energy occurs. To enable a fast disturbance identification, the MSWS loss is embedded into the LSTM model and this also provides the adaptive data window. The existing machine learning algorithms could not deal with the unknown disturbances, a challenge that must be solved in today's more and more complicated grid. With the developed re-identification model based on feature similarity, one can achieve very high identification accuracy under different renewable energy penetrations. Comparisons results with many other machine learning algorithms on the IEEE® 39-bus system demonstrate that the described method has both high disturbance detection and identification accuracies while being robust to varying renewable integration scenarios. The described method has small detection delay and is suitable for real-time power system disturbance identifications.

Technical Implementation of a Server

Figure 13:
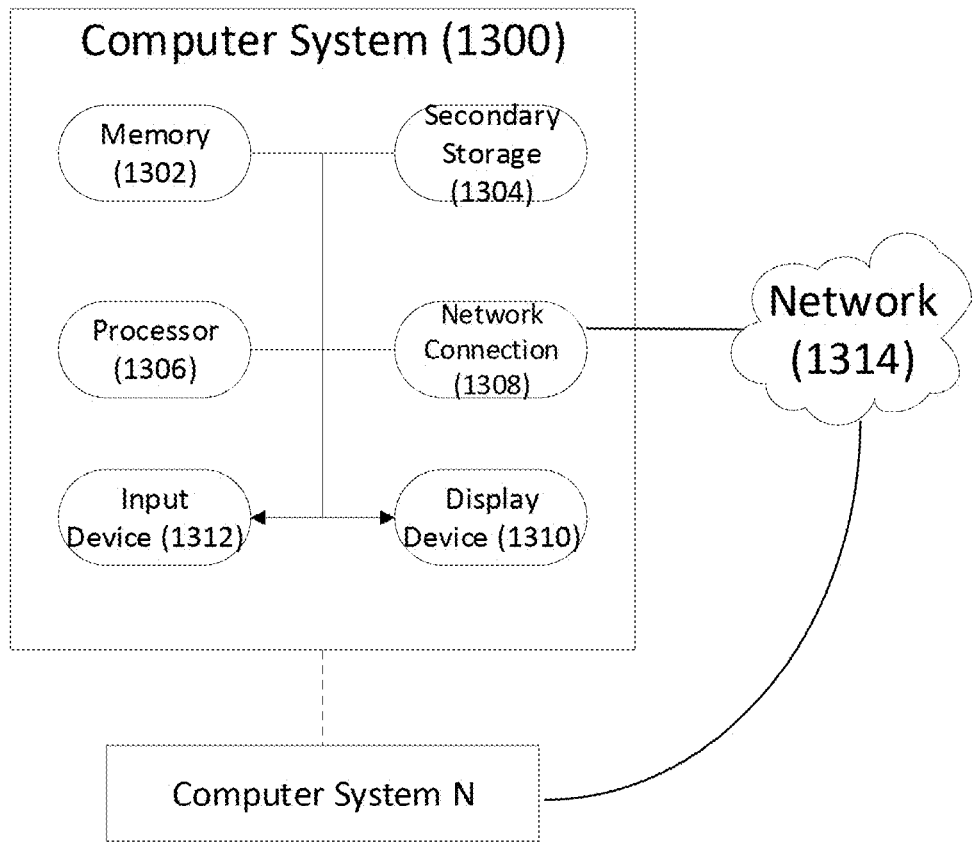
FIG. 13 illustrates exemplary hardware components for a server.

FIG. 13 illustrates exemplary hardware components of a server. A computer system 1300, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 1300, may run an application (or software) and perform the steps and functionalities described above. Computer system 1300 may connect to a network 1314, e.g., Internet, or other network, to receive inquiries, obtain data, and transmit information and incentives as described above.

The computer system 1300 typically includes a memory 1302, a secondary storage device 1304, and a processor 1306. The computer system 1300 may also include a plurality of processors 1306 and be configured as a plurality of, e.g., bladed servers, or other known server configurations. The computer system 1300 may also include a network connection device 1308, a display device 1310, and an input device 1312.

The memory 1302 may include RAM or similar types of memory, and it may store one or more applications for execution by processor 1306. Secondary storage device 1304 may include a hard disk drive, floppy disk drive, CD-ROM drive, or other types of non-volatile data storage. Processor 1306 executes the application(s), such as those described herein, which are stored in memory 1302 or secondary storage 1304, or received from the Internet or other network 1314. The processing by processor 1306 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 1300 may store one or more database structures in the secondary storage 1304, for example, for storing and maintaining the information necessary to perform the above-described functions. Alternatively, such information may be in storage devices separate from these components.

Also, as noted, processor 1306 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 1300.

The input device 1312 may include any device for entering information into the computer system 1300, such as a touch-screen, keyboard, mouse, cursor-control device, microphone, digital camera, video recorder or camcorder. The input and output device 1312 may be used to enter information into GUIs during performance of the methods described above. The display device 1310 may include any type of device for presenting visual information such as, for example, a computer monitor or flat-screen display (or mobile device screen). The display device 1310 may display the GUIs and/or output from sub-system components (or software).

Examples of the computer system 1300 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 1300 is shown in detail, system 1300 may use multiple computer systems or servers as necessary or desired to support the users and may also use back-up or redundant servers to prevent network downtime in the event of a failure of a particular server. In addition, although computer system 1300 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 1300, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method for classification of disturbances in a power network, the method comprising:

receiving at a processor a stream of data from the power network, wherein the power network includes a plurality of Phasor Measurement Units ("PMUs");

detecting, at the processor, an event using an enhanced difference Teager-Kaiser energy operator ("dTKEO") method represented as:

$$\psi_{diff}^{Osc}(f_d(n)) = 4A_n^2 \sin^2 \frac{\Omega_n}{2} \sin^2 \Omega_n \approx A_n^2 \Omega_n^4,$$

where $f_d(n)$ is a difference operator as follows:

$$f_d(n) = f(n) - f(n-1)$$
$$= A_n[\cos(\Omega_n n + \phi_n) - \cos(\Omega_n(n-1) + \phi_n)],$$

$\psi_{diff}^{Osc}(f_d(n))$ is an instantaneous oscillation energy at time n; $A_n$ is an amplitude of the frequency signal; and $\Omega_n$ is a frequency of the damped oscillation;

identifying a PMU associated with a maximum instantaneous oscillation energy at a time n and providing frequency data and voltage data for the PMU to a model, wherein the instantaneous oscillation energy is in order of $10^{-8}$ and a dTKEO value at a moment of disturbance is significantly larger than that during an oscillation process, namely $$\phi_{diff}^{Mom}(f_d(n_0)) >> \phi_{diff}^{Osc}(f_d(n));$$

wherein:

the model including a neural network model is trained for feature lextraction by integrating a long short-term memory (LSTM) with a multi-stage weighted summing (MSWS) loss and an additive angular margin (AAM);

in training the model, the neural network model is constructed by minimizing a loss function;

during a training process of the neural network model, a loss function is used to measure the deviation between a predicted confidence distribution and an actual confidence distribution;

wherein the loss function is an AAM loss;
an MSWS loss based on the AAM in an adaptive LSTM training is defined as follows:

$$Loss_{AAM}^{MSWS} = Loss_{AAM}^{T} + Loss_{AAM}^{C}(n)$$
$$= Loss_{AAM}^{T} + \lambda \frac{1}{n-1} \sum_{1}^{n-1} \frac{i}{n-1} Loss_{AAM}^{i},$$

where $Loss_{AAM}^{T}$ represents the AAM loss at a last time-point of a sampling data, $Loss_{AAM}^{C}(n)$ is a summed AAM loss accumulating from a starting point to an n-th point, and $\lambda$ is a weight of $Loss_{AAM}^{C}(n)$;
calculating $c_i$ for the adaptive LSTM at a sampling datapoint i being $x_i$, where $x_i \in i^{4 \times 1}$ includes the frequency data and the voltage data, and for an i-th LSTM cell:

$h_i = \sigma(Ux_i + Wh_{i-1} + b_h)$, $c_i = \text{Softmax}(Vh_i + b_o) = [c_i^1, c_i^2, K, c_i^K]$, where $h_i$ is a hidden layer state; $c_i$ is a classification confidence predicted by the adaptive LSTM using historical information before sampling datapoint i; U, W, and V are weights; $b_h$ and $b_o$ are biases; Softmax is a function that maps a vector to a probability distribution, and $\sigma$ is an activation function that uses the following sigmoid function $$Sigmoid(z) = \frac{1}{1 + e^{-z}},$$

where z is the input vector;
determining a result pre-classification, wherein:
the classification confidence $c_i$ of each sampling point $x_i$ is an output over time; a confidence threshold vector $c = [c^1, c^2, k, c^k]$, where $c^k$ is a confidence threshold of a k-th class, for an i-th sampling point, a confidence $c_i^k$ is compared with $c^k$; if a confidence threshold of one category is reached when scanning over a sequence data, the process is stopped, and a category kc is the result of pre-classification;
analyzing the result pre-classification to identify a disturbance in the power network; and
reducing cascading blackouts by fixing the identified disturbance in the power network.

* * * * *